(12) United States Patent
Prasad et al.

(10) Patent No.: US 12,093,880 B2
(45) Date of Patent: Sep. 17, 2024

(54) EDGE COMPUTING DEVICE AND SYSTEM FOR VEHICLE, CONTAINER, RAILCAR, TRAILER, AND DRIVER VERIFICATION

(71) Applicant: KoiReader Technologies, Inc., Dallas, TX (US)

(72) Inventors: Ashutosh Prasad, Dallas, TX (US); Vivek Prasad, Patna (IN)

(73) Assignee: KoiReader Technologies, Inc., Dallas, TX (US)

( * ) Notice: Subject to any disclaimer, the term of this patent is extended or adjusted under 35 U.S.C. 154(b) by 0 days.

(21) Appl. No.: 17/910,420

(22) PCT Filed: Mar. 10, 2021

(86) PCT No.: PCT/US2021/021699
§ 371 (c)(1),
(2) Date: Sep. 9, 2022

(87) PCT Pub. No.: WO2021/183641
PCT Pub. Date: Sep. 16, 2021

(65) Prior Publication Data
US 2023/0114688 A1    Apr. 13, 2023

Related U.S. Application Data

(60) Provisional application No. 62/988,082, filed on Mar. 11, 2020.

(51) Int. Cl.
*G06Q 10/0833* (2023.01)
*G06V 20/00* (2022.01)
(Continued)

(52) U.S. Cl.
CPC ......... *G06Q 10/0833* (2013.01); *G06V 20/00* (2022.01); *G06V 20/59* (2022.01); *G06V 20/593* (2022.01); *G06V 40/16* (2022.01)

(58) Field of Classification Search
CPC .... G06Q 10/0833; G06V 20/59; G06V 40/16; G06V 20/593; G06V 20/00
See application file for complete search history.

(56) References Cited

U.S. PATENT DOCUMENTS

2014/0064608 A1\*  3/2014  Kim ................. G06T 7/593
                                                   382/154
2016/0379165 A1   12/2016  Moakley
(Continued)

FOREIGN PATENT DOCUMENTS

WO    WO2015171825 A1    11/2015

OTHER PUBLICATIONS

Kazanskiy, N.L., and Popov, S.B., "Integrated Design Technology for Computer Vision Systems in Railway Transportation," Pattern Recognition and Image Analysis, vol. 25, No. 2, 2015, pp. 215-219.\*

(Continued)

*Primary Examiner* — Nathan Erb
(74) *Attorney, Agent, or Firm* — Lee & Hayes, P.C.

(57) ABSTRACT

Techniques are described for automating the check in and check out process at a logistics facility. For example, a sensor system may be configured to capture sensor data associated with an approaching vehicle. The sensor system may utilize the sensor data to extract information usable to complete forms, assess damage, and authenticate the shipment.

20 Claims, 14 Drawing Sheets

(51) Int. Cl.
    *G06V 20/59*    (2022.01)
    *G06V 40/16*    (2022.01)

(56) References Cited

U.S. PATENT DOCUMENTS

| | | | | |
|---|---|---|---|---|
| 2018/0315057 | A1* | 11/2018 | Temple | G06F 3/04817 |
| 2019/0130417 | A1* | 5/2019 | Watt | G06Q 30/018 |
| 2019/0197896 | A1* | 6/2019 | Bakhishev | H04B 17/27 |
| 2019/0370575 | A1 | 12/2019 | Nandakumar | |
| 2022/0245574 | A1* | 8/2022 | Cella | G06Q 10/087 |

OTHER PUBLICATIONS

PCT Search Report and Written Opinion mailed May 25, 2021 for PCT Application No. PCT/US21/21699, 18 pages.

European Office Action mailed Sep. 26, 2023 for European Patent Application No. 21715481.6, a foreign counterpart to U.S. Appl. No. 17/910,420, 7 pages.

* cited by examiner

EDGE COMPUTING DEVICE AND SYSTEM FOR VEHICLE, CONTAINER, RAILCAR, TRAILER, AND DRIVER VERIFICATION

CROSS-REFERENCE TO RELATED APPLICATION

This application is a U.S. national stage application under 35 USC § 371 of International Application No. PCT/US21/21699 filed on Mar. 10, 2021 and entitled, "EDGE COMPUTING DEVICE AND SYSTEM FOR VEHICLE, CONTAINER, RAILCAR, TRAILER, AND DRIVER VERIFICATION," which claims priority to U.S. Provisional Application No. 62/988,082, filed on Mar. 11, 2020 and entitled "EDGE COMPUTING DEVICE AND SYSTEM FOR VEHICLE, CONTAINER, RAILCAR, TRUCK, TRACTOR, TRAILER, INTERMODAL EQUIPMENT, AND DRIVER VERIFICATION," the entire contents of which are incorporated herein by reference.

BACKGROUND

Shipping, trucking, and other delivery networks have been growing at an ever increasing pace, as more and more goods are moved around the world. Unfortunately, each jurisdiction, company, licensing entity, and/or delivery method has its own forms, documents, labels, and printed text. This wide variety and types of forms, documents and text together with the ever increasing number of containers, trucks, rail cars, and cargo ships has created large logistical delays at the check in and check out points of storage facilities, shipping yards, processing plants, warehouses, distribution centers, ports, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
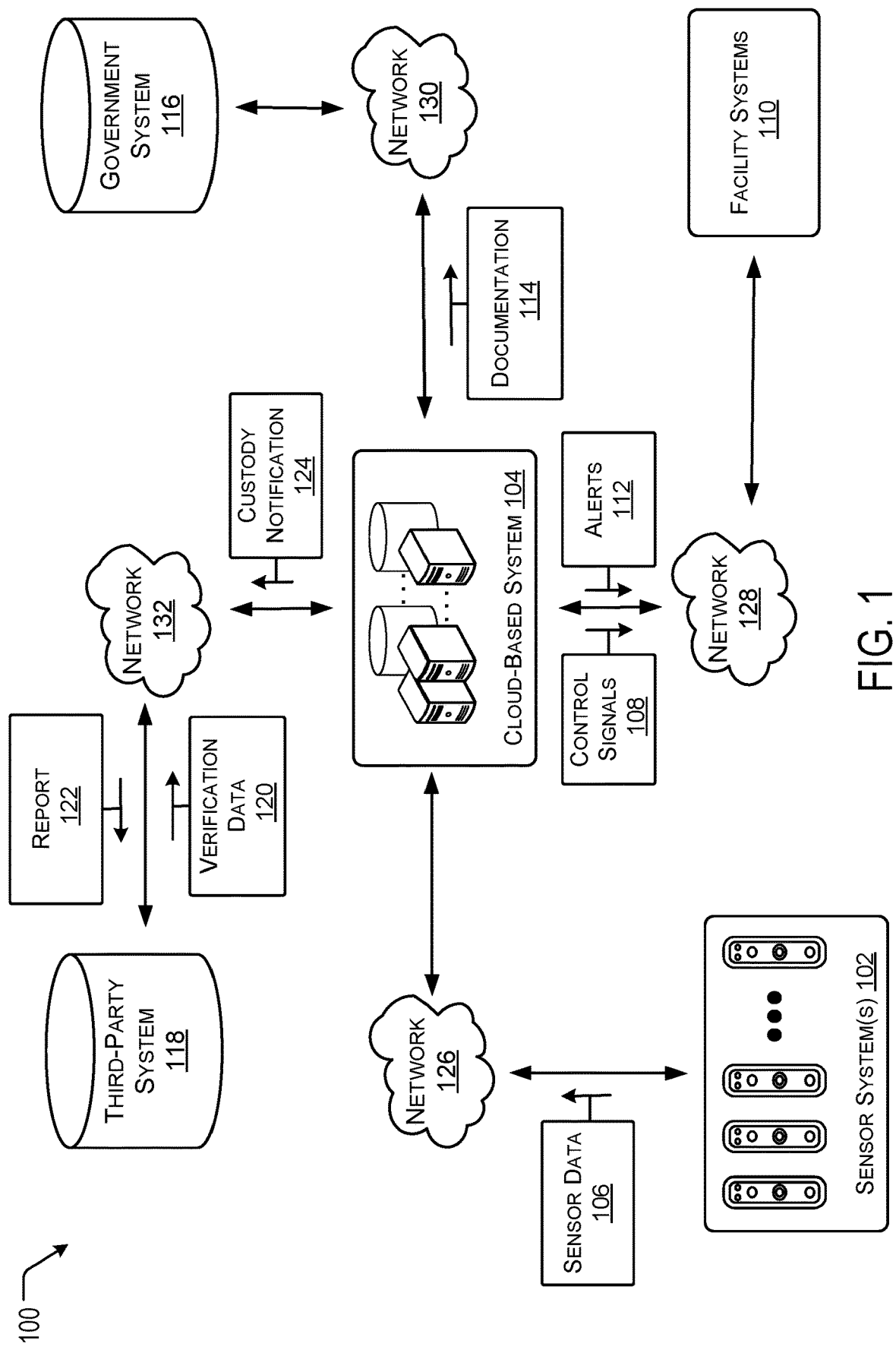
FIG. 1 is an example block diagram of a sensor system and platform for performing check in and check out processes at a logistics facility, according to some implementations.

Discussed herein are systems and devices for automating and computerizing the check in and check out process at entry and exit locations of facilities associated with the logistics and shipping industries. For example, a system including internet of things (IoT) computing devices may be positioned about entry and exit locations (e.g., check in and/or check out area) of a storage facility, shipping yard, processing plant, warehouse, distribution center, port, rail yard, rail terminal, and the like. The IoT computing device may be equipped with various sensor and/or image capture technologies, and configured to capture, parse, and identify vehicle and container information from the exterior of vehicles, containers, pallets, and the like. The vehicle and container information may include shipping documents, such as BOL (Bill of Lading), packing list, container identifiers, chassis identifiers, vehicle identifiers, and the like. The IoT computing devices may also capture, parse, and identify driver information in various formats, such a driver licenses, driver's identification papers, facial features and recognition, and the like.

The captured information may then be used to verify entry (e.g., the driver and vehicle is authorized and/or expected), complete required forms (e.g., government forms, custody forms, liability forms, and the like), and notify various entities that delivery tasks are completed, delayed, and/or on schedule. For example, at a port, the captured information may be utilized to identify an incoming shipment of containers, complete initial customs forms, and transfer custody or delivery of container and any goods associated therewith.

In the manner discussed herein, the system may reduce the amount of time associated with checking in and/or out each vehicle, container, and the like as it enters and exits a facility. For example, conventional manual check out processes at a logistics facility typically take between 30 and 45 minutes per vehicle and, in some case, may take as long several hours per vehicle. In some instances, such as during peak shipping seasons, the long check in and out process may also result in long lines which add further delays, as the vehicles and drivers wait in line at appropriate entry and exit points. Alternatively, the system, described herein, may reduce the overall check in and out times to just few minutes or less, thereby reducing the congestion at the exit and entry points and allowing the vehicles and drivers to spend more time transporting goods and less time waiting and completing forms.

As discussed above, the system may include multiple IoT devices as well as cloud-based services, such as cloud based data processing. One or more IoT computing device(s) may be installed at entry and/or exit points of a facility. The IoT computing devices may include a smart network video recorder (NVR) or other type of EDGE computing device. Each IoT device may also be equipped with sensors and/or image capture devices usable at night or during the day. The sensors may be weather agnostic (e.g., may operate in foggy, rainy, or snowy conditions), such as via infrared image systems, radar based image systems, LIDAR based image systems, SWIR based image systems, Muon based image systems, radio wave based image systems, and/or the like. The IoT computing devices and/or the cloud-based services may also be equipped with models and instructions to capture, parse, identify, and extract information from the vehicles, containers, and/or various documents associated with the logistics and shipping industry. For example, the IoT computing devices and/or the cloud-based services may be configured to perform segmentation, classification, attribute detection, recognition, document data extraction, and the like. In some cases, the IoT computing devices and/or an associated cloud based service may utilize machine learning and/or deep learning models to perform the various tasks and operations.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In some implementations, the IoT computing devices may also be configured to estimate one or more statuses of the contents of the containers, crates, and the like as the vehicles enter and exit the facility. For example, the IoT computing devices may use various types of a sensors (e.g., LIDAR, SWIR, Radio Wave, Muon, etc.), with capabilities such as but not limited to varying fields of view, along with the camera or image systems and edge computing capabilities to detect various attributes such as container damage, leakage, size, weight, and the like of an a vehicle, chassis, and/or container. In this manner, the IoT computing devices may operate as part of a network, IoT, colocation, Wi-Fi, localzones, Bluetooth Low Energy, or the like to provide a comprehensive diagnostic of the physical attributes of a vehicle, truck, trailer, chassis, rail car, cargo, ship, and/or container during entry and exit of the facility. In some cases, the IoT computing devices and/or the cloud based services may be used to identify vehicles, chassis, and/or container that require maintenance prior to further deployment.

As one illustrative example, the IoT computing devices may determine a weight and/or dimensions of the vehicle, trailer, chassis, or container, such as in the case of a weighing station on highways as well as at the check-in and/or check-out gates at warehouses, distribution centers, yards, etc. by analyzing the image data to determine, for instance, an actual distance between the chassis and the wheels. The actual distance may then be compared with an expected distance or known empty distance to determine a weight of the cargo.

In some cases, since the sensor and/or image data received may be from different sources or types of sensors at different ranges and generalities, the IoT computing devices may perform a data normalization using techniques such as threshold-based data normalization and machine learning algorithms to identify the driver, vehicle, or container. It should be understood, that the system may utilize different weighted averages or thresholds based on the data source (e.g., sensor type, location, distance, and position), the current weather (e.g., sunny, rainy, snowy, or foggy), and time of day when performing data normalization. In some cases, machine learning algorithms may also be applied to remove the distortion from images caused by rain, dust, sand, fog, and the like as well as to brighten the sensor and/or images shot in low-light or dark conditions.

FIG. 1 is an example block diagram 100 of a sensor system 102 and platform 104 for performing check in and check out processes at a logistics facility, according to some implementations. For example, as a vehicle (e.g., a truck, rail car, ship, or the like) approaches an entry or exit point of the logistics facility (e.g., a storage facility, warehouse, port, holding yard, commercial establishment, and the like), the sensor systems 102 may be configured to detect the vehicle and capture sensor data 106 (e.g., video, images, and the like) associated with the vehicle, one or more driver(s) of the vehicle, and/or one or more container(s), crate(s), or pallet(s) associated with the vehicle.

The captured sensor data 106 may be used to verify the vehicle, driver, container or contents of the container, and the like. In some instances, the cloud-based system 104 may process the sensor data 106, for instance, using one or more machine learned model(s) to segment, classify, and identify the desired information (e.g., the driver's identifier, the vehicle identifier, and/or the container identifier). In some cases, each of the desired identifiers may be associated with independent heads of the machine learned model. In other examples, the processing may be performed on the IoT sensor system 102, such as NVR device or EDGE computing device.

In some examples, the sensor data 106 may also be utilized to determine a state or status of the vehicle, container, chassis, or the like. For example, the state or status may be used to determine if damage occurred during shipping and/or if any repairs to the vehicle, container, or chassis are necessary before redeployment. In some instances, additional machine learned models may be employed by the sensor system 102 and/or the cloud-based system 104 to detect damage or other wear and tear of the vehicle, container, and/or chassis. In some specific examples, the sensor systems 102 may include infrared, thermal, or other types of sensors capable of imaging or generating sensor data 106 associated with the contents of the container without opening the container. In these examples, the sensor data 106 may also be used to detect any damage caused to the contents of the containers during shipping prior to the facility accepting custody, liability, and/or responsibility for the contents. For instance, the sensor system 102 and/or the cloud-based system 104 may compare the captured sensor data 106 and/or the status output by the machine learned models to a recorded status of the vehicle, container, and/or chassis associated with the vehicle, container, and/or chassis at the time of deployment.

In the current example, the cloud-based system 104 or other central computing system may be configured to, upon verification of the driver, vehicle, container, or the like, generate control signals 108 for the facility systems 110. For instance, the control signal 108 may cause a facility gate to open or a crane or other unloading/loading equipment to commence a corresponding operation (e.g., unloading or loading of goods). The cloud-based system 104 may also generate one or more alert(s) 112 to various systems 110 or operators within the facility instructing the operators to perform various tasks or notifying the operators as to a status of the vehicle, container, or chassis. As an illustrative example, if the sensor system 102 or the cloud-based system 104 detected damage to the container, the alert 112 may instructs an operator to perform a manual inspection of the contents of the container.

The sensor system 102 and/or the cloud-based system 104 may also be configured to complete and submit various types of documentation associated with the vehicle, containers, and/or content of the containers at the time the vehicle enters or exits the facility. For example, as illustrated, if the vehicle is a ship entering a port carrying goods in international trade, the sensor system 102 and/or the cloud-based system 104 may capture the sensor data 106 and complete, using the output of the machine learned models, various customs forms and government documentation 114. In some examples, the sensor system 102 and/or the cloud-based system 104 may detect labeling, identifiers, and other markers, in any language, and select appropriate government entities based on the detected information. The sensor system 102 and/or the cloud-based system 104 may then determine the appropriate government systems 116 and documentation 114 based on the selected government entities. The sensor system 102 and/or the cloud-based system 104 may then submit the documentation 114 to the corresponding systems 116 as required by the laws of the different jurisdictions.

The facility may also generate and send reports 122 associated with various statuses, documents, and data to various third-party systems 118 in addition to the government entities. For example, the sensor system 102 and/or the cloud-based system 104 may complete various reports 122 including the state or status of the vehicle, container, chassis, contents and the like to the owner of the goods at the time of entry and/or exit of the vehicle to and from the facility. As one illustrative example, the sensor system 102 and/or the cloud-based system 104 may request and receive verification data 120 from the third-party system 118 associated with a vehicle attempting to enter the facility. The verification data 120 may be utilized to verify or authenticate the driver, vehicle, and/or container using the extracted identifiers from the vehicle, container, chassis, and the like.

In some cases, the sensor system 102 and/or the cloud-based system 104 may also preform facial or other biometric identification of the driver to assist with determining an identity without having to access driver documents, such as a license. In one specific example, the driver may be instructed to place or hold various documents in a manner that the documents are visible through, for instance, a front or side windshield. In other examples, the facility may include a document reader sensor located proximate to the entry and/or exit of the facility. The driver may then place the physical documents to be scanned within the reader sensor. In this manner, the sensor system 102 may capture sensor data 106 associated with various physical paperwork associated with the driver, vehicle, container, and/or contents of the container and, thereby, extract information not readably available on the exterior of the vehicle, container, and/or chassis. Examples of data that may be extracted for either completing the government documents 114 and/or for reporting to the third-party systems 118 may include shipping documents, vehicle license plates, vehicle ID where applicable, container IDs, vehicle vin numbers, chassis ID, chassis' license plate, SKU ID, pallet ID, safety inspection sticker, rail car details, and the like.

Once the sensor system 102 and/or the cloud-based system 104 has parsed or extracted the information, the government documents 114 are processed by the government entity, the sensor system 102 and/or the cloud-based system 104 may cause the facility to accept or deny custody of the vehicle, container, and/or contents of the container. The sensor system 102 and/or the cloud-based system 104 may also report the acceptance and/or denial of the custody to the third-party system 118, such as the shipper entity, via a custody notification 124, as shown.

In the current example, the sensor data 106, documentation 114, control signals 108, alerts 112, custody notifications 124, verification data 120 and reports 122 as well as other data may be transmitted between various systems using networks, generally indicated by 126-132. The networks 126-132 may be any type of network that facilitates compunction between one or more systems and may include one or more cellular networks, radio, WiFi networks, short-range or near-field networks, infrared signals, local area networks, wide area networks, the internet, and so forth. In the current example, each network 126-132 is shown as a separate network but it should be understood that two or more of the networks may be combined or the same.

Figure 2:
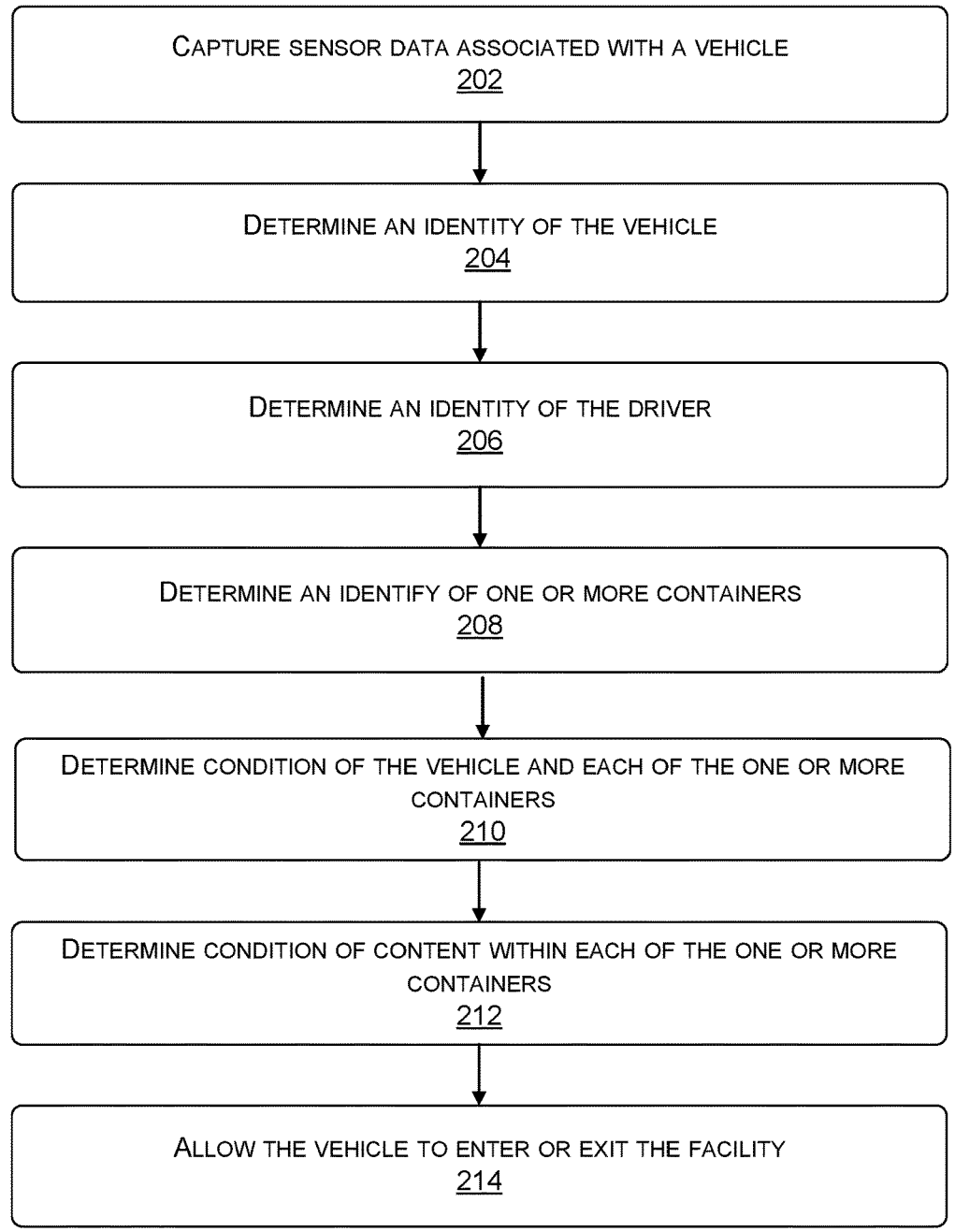
FIG. 2 is a flow diagram illustrating an example process associated with verifying a vehicle, driver, and/or container during entry or exit of a facility according to some implementations.
Figure 3:
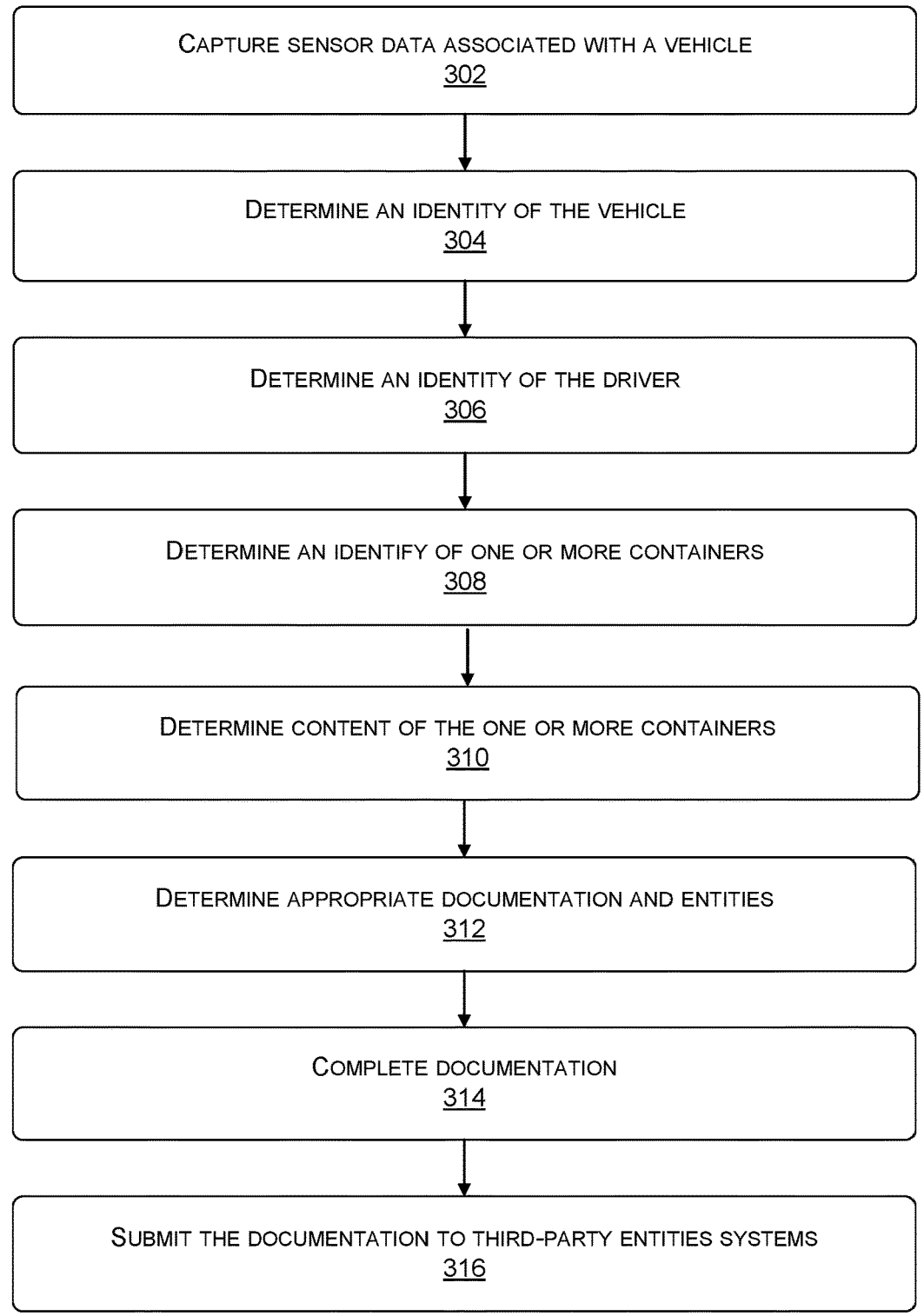
FIG. 3 is a flow diagram illustrating an example process associated with completing documentation on behalf of a facility and/or driver upon entry to or exit from the facility according to some implementations.
Figure 4:
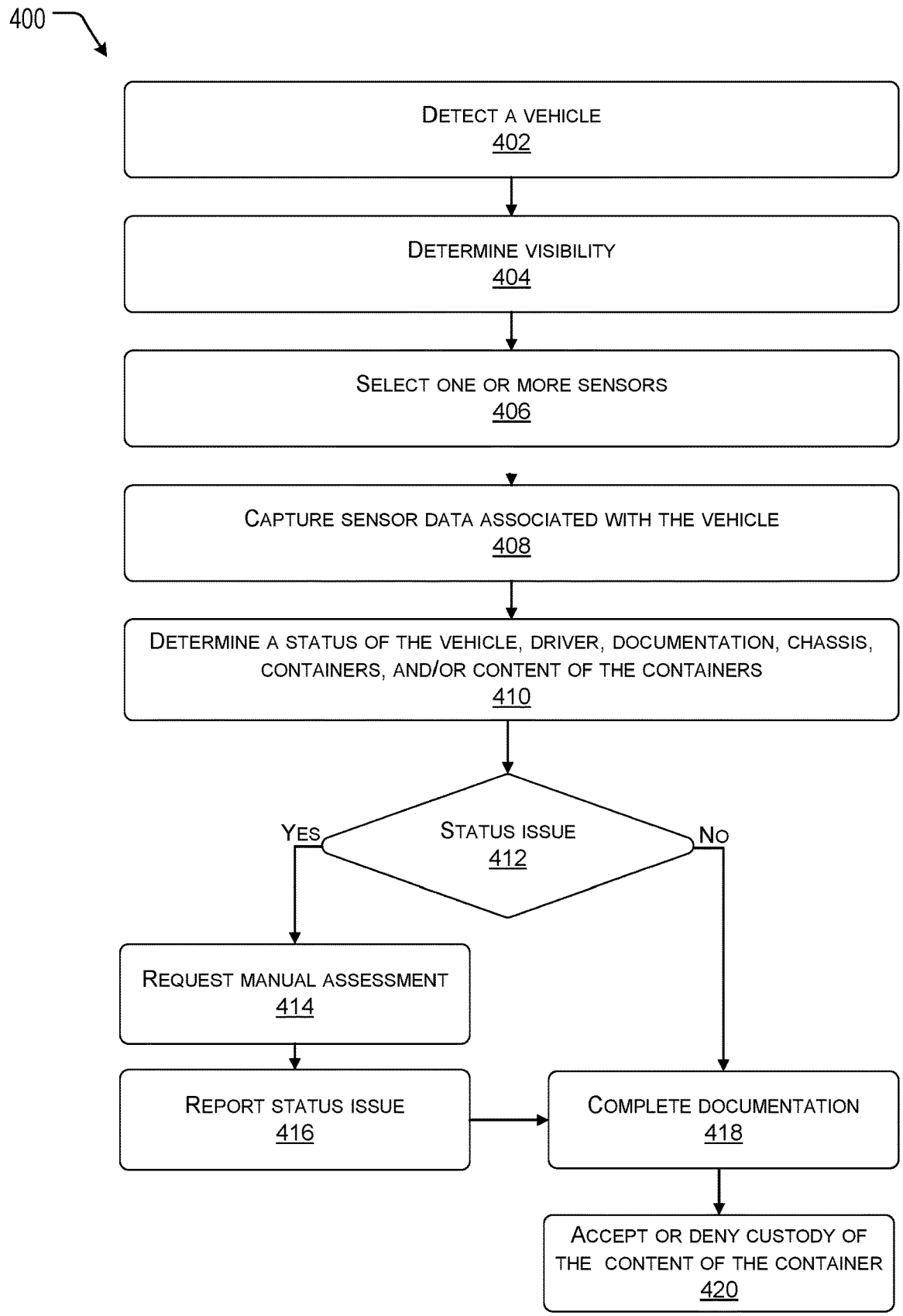
FIG. 4 is a flow diagram illustrating an example process associated with inspecting cargo upon exit from or entry into a facility according to some implementations.

FIGS. 2-4 are flow diagrams illustrating example processes associated with the IoT sensor systems and cloud-based systems for checking in and out vehicles, containers, and content from a logistics or other facility discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example process associated with verifying a vehicle, drive, and/or container during entry or exit of a facility according to some implementations. As discussed herein, the system may be configured to automate check in and check out process associated with entering and exiting a logistics facility, such as a warehouse, port, rail depot, and the like. The system may include IoT, EDGE, or NVR sensors and image devices that may, in some cases, utilize cloud-based services to identify and verify vehicles, drivers, containers, as well as to capture data associated with the vehicles, drivers, containers to verify the correct parties are present as expected.

At 202, a sensor system may capture sensor data associated with a vehicle. For example, the vehicle may be approaching an entrance or an exit of a logistics facility. The sensor system may capture sensor data associated with an exterior of the vehicle, an exterior of a chassis coupled to the vehicle, an exterior one or more containers associated with the vehicle, as well as sensor data associated with displayed documentation (such as paperwork displayed via one or more of the windows of the vehicle), an interior or content of the containers or vehicle, and the like. In some cases, the sensor data may include LIDAR data, SWIR data, red-green-blue image data, thermal data, Muon data, radio wave data, weight data, infrared data, and the like.

At 204, the sensor system may determine an identity of the vehicle. For example, using a machine learned model, the sensor system may identify, classify, and extract vehicle identification information, such as VIN, vehicle ID, license plate numbers, serial numbers, fleet numbers, and the like from the sensor data representing the exterior and/or the interior of the vehicle cab. Using the extracted data, the sensor system may also verify the identity of the vehicle and/or a chassis coupled to the vehicle by, for instance, comparing with one or more records provided by a transit company, trucking company, carrier company, shipping company, and the like. In this manner, the sensor system may determine if the delivery is arriving and/or departing on time and, if not, how late or behind the vehicle and/or facility is currently.

At 206, the sensor system may determine an identity of the driver of the vehicle. For example, the sensor system may utilize one or more machine learned models to perform facial recognition on the sensor data representative of the driver. The sensor system may also identify or extract data from documentation associated with the driver, such as a license, operator identifier, or tag visible through a window of the vehicle. Again, using the extracted data, the sensor system may verify the identity of the driver by, for instance, comparing with one or more records provided by a transit company, trucking company, carrier company, shipping company, and the like. In this manner, the system may determine if the assigned driver is operating the assigned vehicle. In this case, if driver differs from the assigned driver, the system may inquire via, for instance, a third-party system if a personnel change has occurred and/or initiate other investigations.

At 208, the sensor system may determine an identity of one or more containers associated with the vehicle. For example, the sensor system may utilize one or more machine learned models to perform identification and extract text displayed on the exterior of the container in order to determine the container's identity. For example, the system may extract a container identifier, an owner identifier, a warrantor identifier, a country of origin, and the like. Once again, using the extracted data, the sensor system may verify the identity of each of the containers by, for instance, comparing with one or more records provided by a transit company, trucking company, carrier company, shipping company, and the like. In this manner, the system may determine if the expected cargo is arriving and, if the cargo is on time, early or delayed. (In the PDF, it says "Identify" rather than "Identity")

At 210, the sensor system may determine a condition of the vehicle and each of the one or more containers. For example, the sensor system may utilize one or more machine learned models to detect damage associated with the vehicle, the chassis, and/or individual containers. In some cases, the sensor system may determine damage based on prior stored records or sensor data associated with the corresponding vehicle, chassis, or container. For instance, the sensor system may determine an increase in rust at a particular location of the container, one or more new dents, starches, holes, and other impact related damage, and the like. In some cases, in response to detecting new or increased damage, the sensor system may notify or alert a facility operator to the damage prior to the facility accepting delivery and/or custody of the contents of the container. The sensor system may also compare the detected damage to one or more damage thresholds to determine if the newly detected damage warrants the attention of a facility operator. For example, a dent having a greater area than a damage area threshold (e.g., 2 square inches, 4 square inches, 10 square inches, and the like) may trigger an alert for a facility operator.

At 212, the sensor system may determine a condition of the contents within each of the one or more containers. For example, the sensor system may utilize portions of the sensor data as an input to one or more machine learned model to determine a status of the content of each individual container. For example, the system may detect damage to the content, presence of water, organic material, or the like, as well as if the packaging of the contents is intact or damaged. Similar to damage upon the containers, the sensor system may also compare the detected status to one or more status thresholds to determine if the contents should be manually inspected by a facility operator or if the facility can accept custody (e.g., upon entry) or transfer custody to the driver (e.g., upon exit).

At 214, the sensor system may allow the vehicle to enter or exit the facility. For example, if the vehicle, driver, and containers passed the verification and there was no damage or concerns detected with the status of the vehicle, containers, or content of the containers, the system may send a control signal to allow the vehicle to enter and/or exit the facility.

FIG. 3 is a flow diagram illustrating an example process 300 associated with completing documentation on behalf of a facility and/or driver upon entry or exit to the facility according to some implementations. As discussed herein, the system may be configured to automate check in and check out process associated with entering and exiting a logistics facility, such as a warehouse, port, rail depot, and the like. The system may include IoT, EDGE, or NVR sensors and image devices that may, in some cases, utilize cloud-based services to identify and verify vehicles, drivers, containers, as well as to capture data associated with the vehicles, drivers, containers to complete forms (such as custody, customs, and the like) and to report and/or file the forms with corresponding parties (e.g., jurisdictions, buyers, sellers, warrantors, and the like).

At 302, a sensor system may capture sensor data associated with a vehicle. For example, the vehicle may be approaching an entrance or an exit of a logistics facility. The sensor system may capture sensor data associated with an exterior of the vehicle, an exterior of a chassis coupled to the vehicle, an exterior one or more containers associated with the vehicle, as well as sensor data associated with displayed documentation (such as paperwork displayed via one or more of the windows of the vehicle), an interior or content of the containers or vehicle, and the like. In some cases, the sensor data may include LIDAR data, SWIR data, red-green-blue image data, thermal data, Muon data, radio wave data, weight data, infrared data, and the like.

At 304, the sensor system may determine an identity of the vehicle. For example, using a machine learned model, the sensor system may identify, classify, and extract vehicle identification information, such as VIN, vehicle ID, license plate numbers, serial numbers, fleet numbers, and the like from the sensor data representing the exterior and/or the interior of the vehicle cab. Using the extracted data, the sensor system may also verify the identity of the vehicle and/or a chassis coupled to the vehicle by, for instance, comparing with one or more records provided by a transit company, trucking company, carrier company, shipping company, and the like. In this manner, the sensor system may determine if the delivery is arriving and/or departing on time and, if not, how late or behind the vehicle and/or facility is currently.

At 306, the sensor system may determine an identity of the driver of the vehicle. For example, the sensor system may utilize one or more machine learned models to perform facial recognition on the sensor data representative of the driver. The sensor system may also identify or extract data from documentation associated with the driver, such as a license, operator identifier, or tag visible through a window of the vehicle. Again, using the extracted data, the sensor system may verify the identity of the driver by, for instance, comparing with one or more records provided by a transit company, trucking company, carrier company, shipping company, and the like. In this manner, the system may determine if the assigned driver is operating the assigned vehicle. In this case, if driver differs from the assigned driver, the system may inquire via, for instance, a third-party system if a personnel change has occurred and/or initiate other investigations.

At 308, the sensor system may determine an identity of one or more containers associated with the vehicle. For example, the sensor system may utilize one or more machine learned models to perform identification and extract text displayed on the exterior of the container in order to determine the container's identity. For example, the system may extract a container identifier, an owner identifier, a warrantor identifier, a country of origin, and the like. Once again, using the extracted data, the sensor system may verify the identity of each of the containers by, for instance, comparing with one or more records provided by a transit company, trucking company, carrier company, shipping company, and the like. In this manner, the system may determine if the expected cargo is arriving and, if the cargo is on time, early or delayed. (In the PDF "Identify" is used instead of "Identity")

At 310, the sensor system may determine contents of the one or more containers associated with the vehicle. For example, the sensor system may utilize portions of the sensor data as an input to one or more machine learned model to determine a status of the content of each individual container, as discussed above. In some cases, the status may include a type, amount (e.g., number of pallets, units, packages, and the like) within each container. For example, the system may verify that a container includes the correct merchandise in the expected numbers.

At 312, the sensor system may determine the appropriate documentation and entities. For example, the sensor system may utilize the extracted data to determine which government agencies and private entities are associated with the vehicle, containers, and/or content of the containers. The system may then identify the appropriate documentation or forms for each agency or entity. For instance, if the vehicle is a ship entering a port in the United States. The sensor system may detect that the country of origin is China and that customs documents should be completed and submitted to both the United States and China.

At 314, the sensor system may complete documentation on behalf the entering and/or exiting vehicle and, at 316, submit the documentation to the third-party entity systems. For example, if the vehicle, chassis, and containers pass the verification and inspection process, the sensor system may utilize the extracted data to complete various forms, such as bill of lading, custom forms, custody forms, purchase or payment forms, and the like. In some examples, the sensor system may submit the completed forms to the appropriate entity using one or more networks, such as the networks of FIG. 1.

FIG. 4 is a flow diagram illustrating an example process 400 associated with inspecting cargo upon exit or entry into a facility according to some implementations. For example, as discussed above, the system may determine from sensor data of the vehicle, chassis, container, and/or contents of the container a status associated with each and, based on the status, accept or deny custody of the contents of the container.

At 402, the sensor system may detect a vehicle. For example, the vehicle may have entered a scanning zone or approached an entry or exit location of a facility.

At 404, the sensor system may determine visibility of the environment. For example, the system may determine the availability of light based at least in part on one or more photosensors, a time of day, and/or a location of the sensor system. The sensor system may also determine a weather condition such as a rainstorm, hailstorm, or snowstorm.

At 406, the sensor system may select one or more sensors. For instance, the system may select the sensor devices to activate based at least in part on the vehicle, the available light, and/or the current weather conditions. For instance, the system may utilize red-green-blue image devices during the day and LIDAR and infrared sensors and illuminators at night.

At 408, the sensor system may capture sensor data associated with a vehicle. As discussed above, the sensor system may capture sensor data associated with an exterior of the vehicle, an exterior of a chassis coupled to the vehicle, an exterior one or more containers associated with the vehicle, as well as sensor data associated with displayed documentation (such as paperwork displayed via one or more of the windows of the vehicle), an interior or content of the containers or vehicle, and the like.

At 410, the sensor system may determine a status of the vehicle, driver, documentation, chassis, containers, and/or content of the containers based at least in part on the captured sensor data. For instance, the captured sensor data may be processed or input into a machine learned model that generates one or more statuses or states of the vehicle, driver, documentation, chassis, containers, and/or content of the containers.

At 412, the sensor system may determine if the status of one or more of the vehicle, the driver, the documentation, the chassis, the containers, and/or the content of the containers has an issue present. For example, the sensor system may determine that the container identifier fails to match an expected container identifier or that the documentation is missing an authorization, governmental approval, or change in custody to the driver. In one specific example, the sensor system may determine if the content of the containers are counterfeit or otherwise infringe the rights of others. In this specific example, the sensor system may extract a tradename printed on the merchandise within the containers and determine the tradename belongs to a third party within the current jurisdiction based on, for instance, a publicly available database.

If the sensor system does detect an issue with the status of the vehicle, the driver, the documentation, the chassis, the containers, and/or the content of the containers, the process 400 may proceed to 414. At 414, the sensor system may request a manual assessment of the vehicle, the driver, the documentation, the chassis, the containers, the content of the containers, and/or a combination thereof. The system may also, at 416, report any status issue to an appropriate or detected party, such as a governmental agency and/or the owner of the contents of the containers.

At 418, the sensor system may complete documentation on behalf the entering and/or exiting vehicle. For example, the sensor system may utilize the extracted data to complete various forms, such as bill of lading, custom forms, custody forms, purchase or payment forms, and the like. In some examples, the sensor system may submit the completed forms to the appropriate entity using one or more networks, such as the networks of FIG. 1. And, at 420, the sensor system, on behalf of the facility, may accept or deny custody of the content of the containers.

Figure 5:
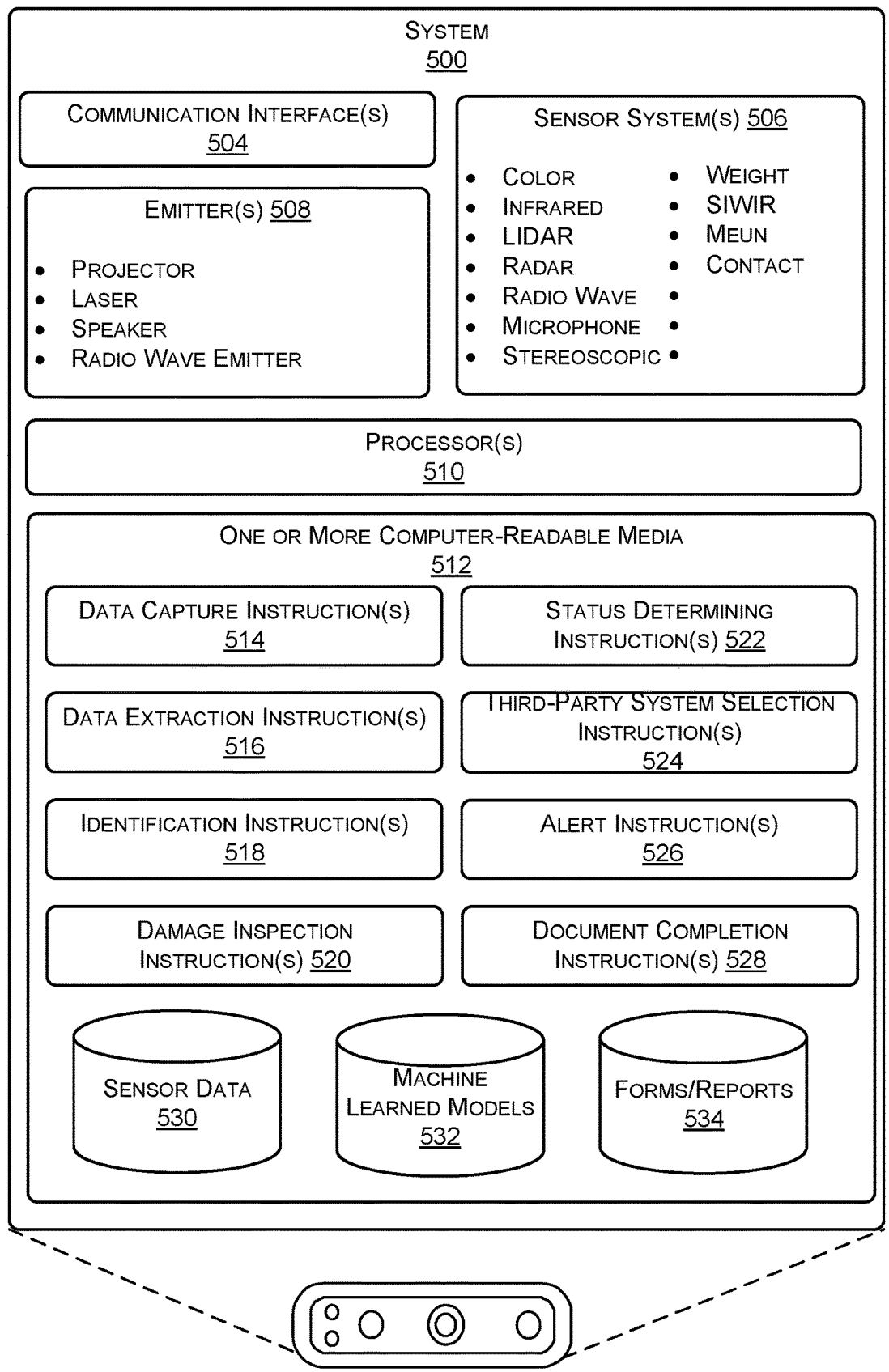
FIG. 5 is an example system that may implement the techniques described herein according to some implementations.

FIG. 5 is an example system 500 that may implement the techniques described herein according to some implementations. The system 500 may include one or more communication interface(s) 504 (also referred to as communication devices and/or modems), one or more sensor system(s) 506, and one or more emitter(s) 508.

The system 500 can include one or more communication interfaces(s) 502 that enable communication between the system 500 and one or more other local or remote computing device(s) or remote services, such as a cloud-based service of FIG. 1. For instance, the communication interface(s) 502 can facilitate communication with other proximate sensor systems, a central control system, or other facility systems. The communications interfaces(s) 502 may enable Wi-Fi-based communication such as via frequencies defined by the IEEE 802.11 standards, short range wireless frequencies such as Bluetooth, Bluetooth Low Energy (LE), cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 506 may be configured to capture the sensor data 530 associated with an exterior and/or interior of a vehicle, chassis, container, and/or content of the container. In at least some examples, the sensor system(s) 506 may include thermal sensors, time-of-flight sensors, location sensors, LIDAR sensors, SWIR sensors, radar sensors, sonar sensors, infrared sensors, cameras (e.g., RGB, IR, intensity, depth, etc.), Muon sensors, microphone sensors, environmental sensors (e.g., temperature sensors, humidity sensors, light sensors, pressure sensors, etc.), and the like. In some examples, the sensor system(s) 506 may include multiple instances of each type of sensors. For instance, camera sensors may include multiple cameras disposed at various locations.

The system 500 may also include one or more emitter(s) 508 for emitting light and/or sound. By way of example and not limitation, the emitters in this example include light, illuminators, lasers, patterns, such as an array of light, audio emitters, and the like.

The system 500 may include one or more processors 510 and one or more computer-readable media 512. Each of the processors 510 may itself comprise one or more processors or processing cores. The computer-readable media 512 is illustrated as including memory/storage. The computer-readable media 512 may include volatile media (such as random access memory (RAM), Graphics Processing Unit (GPU), Tensor Processing Unit (TPU)) and/or nonvolatile media (such as read only memory (ROM), Flash memory, optical disks, magnetic disks, and so forth). The computer-readable media 512 may include fixed media (e.g., RAM, ROM, GPU, a fixed hard drive, and so on) as well as removable media (e.g., Flash memory, a removable hard drive, an optical disc, and so forth). The computer-readable media 512 may be configured in a variety of other ways as further described below.

Several modules such as instructions, data stores, and so forth may be stored within the computer-readable media 512 and configured to execute on the processors 510. For example, as illustrated, the computer-readable media 512 stores data capture instructions 514, data extraction instructions 516, identification instructions 518, damage inspection instructions 520, status determining instructions 522, third-party system selection instruction 524, alert instructions 526, document completion instructions 528, as well as other instructions, such as an operating system. The computer-readable media 512 may also be configured to store data, such as sensor data 530, machine learned models 532, and forms and reports 534, as well as other data.

The data capture instructions 514 may be configured to utilize or activate the emitters 508 and/or the sensor systems 506 to capture data associated with a vehicle, driver, operator, container, package, chassis, or other transportation related system or vessel. In some cases, the data capture instructions 514 may select between individual sensor systems 506 based on a current weather, visibility, light, time of day, time of year, physical location, type and/or size of vehicle, type and/or size of container, number of containers, and the like.

The data extraction instructions 516 may be configured to input the captured sensor data 530 into one or more machine learned models 532 to generate and/or extract text and data associated with the vehicle, container, and/or content of the containers. The data may be extracted from the exterior or interior of the vehicle or containers, documents associated with the vehicle or containers, and the like.

The identification instructions 518 may be configured to determine an identity of the vehicle, container, or content of the containers, a chassis associated with the vehicle, a driver or operator of the vehicle, an entity associated with the vehicle, container, or content of the containers. For example, the identification instructions 518 may utilize one or more machine learned models 532 with respect to the sensor data 530 to determine the identification as discussed above.

The damage inspection instructions 520 may be configured to input the captured sensor data 530 into one or more machine learned models 532 to detect damage with respect to the vehicle, the chassis, the containers, and/or the content of the containers. For example, the damage inspection instructions 520 may detect damage using the machine learned models then compare the damage detected with any known damage to determine if the damage was received while the vehicle was in transit. In some cases, the damage inspection instructions 520 may also rate the damage, for instance, using a severity rating.

The status determining instructions 522 may be configured to input the captured sensor data 530 into one or more machine learned models 532 to determine a status with respect to the vehicle, the driver, the documentation, the chassis, the containers, and/or the content of the containers. For example, the status determining instructions 522 may determine that the presented documentation is incomplete or lacking one or more authorizations.

The third-party system selection instruction 524 may be configured to select and/or identify various entities and associated documentation that is required, associated with the vehicle, container, or content of the container and/or should otherwise be completed by the document completion instructions 528. For example, the third-party system selection instruction 524 may select the entities and/or documents based at least in part on the data generated by the data extraction instructions 516, the identification instructions 518, the damage inspection instructions 520, the status determining instructions 522, and/or a combination thereof.

The alert instructions 526 may be configured to alert or otherwise notify a facility operator and/or facility system in response to the data generated by the data extraction instructions 516, the identification instructions 518, the damage inspection instructions 520, the status determining instructions 522, and/or a combination thereof. For example, the alert instructions 526 may open a gate, request manual inspection of the contents of the container or review of a document, and the like.

The document completion instructions 528 may be configured to complete the documents selected by the third-party system selection instructions 524 based on the data generated by the data extraction instructions 516, the identification instructions 518, the damage inspection instructions 520, the status determining instructions 522, and/or a combination thereof. The document completion instructions 528 may also transmit or submit the completed documents to the appropriate third-party systems on behalf of the facility, driver, or the like.

Figure 6:
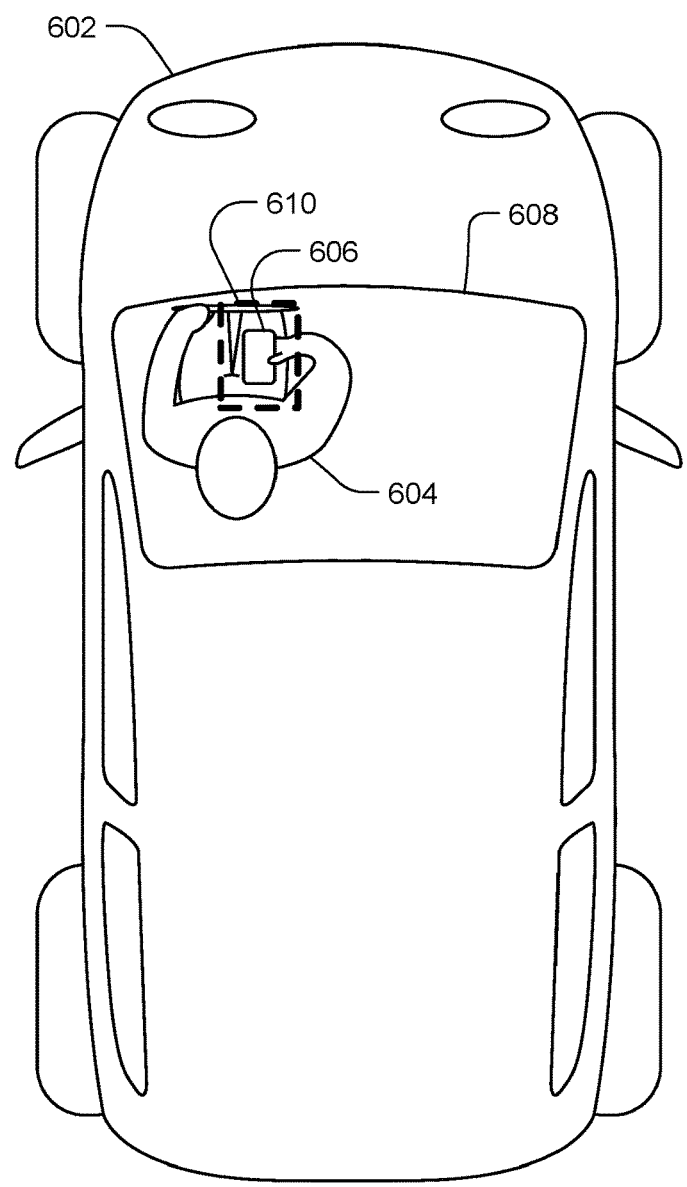
FIG. 6 is an example pictorial view associated with the systems of FIGS. 1-5 according to some implementations.

FIG. 6 is an example pictorial view 600 associated with the systems of FIGS. 1-5 according to some implementations. In the current example, a vehicle 602, such as a delivery van, is viewed from above. The vehicle 602 may be approaching an exit or entry of a logistics facility as discussed above. The driver 604 is displaying an authorization document 606, such as a license, through the window 608 of the vehicle 602. The sensor system (not shown) is capturing sensor data and/or image data, generally indicated by 610 associated with the displayed document 606.

The sensor system, as discussed above, may extract textual content from the document 606 using one or more machined learned models and, using the output of the machine learned model, authenticate the vehicle 602, the driver 604, and the like as well as to select or identify additional documents or paperwork associated with the delivery, complete the identified documents, and submit the completed documents to an appropriate entity. In some cases, sensor system may translate the extracted content in order to complete one or more of the identified paperwork to further reduce the likelihood of an issue with one or more of the entities authorization the delivery.

Figure 7:
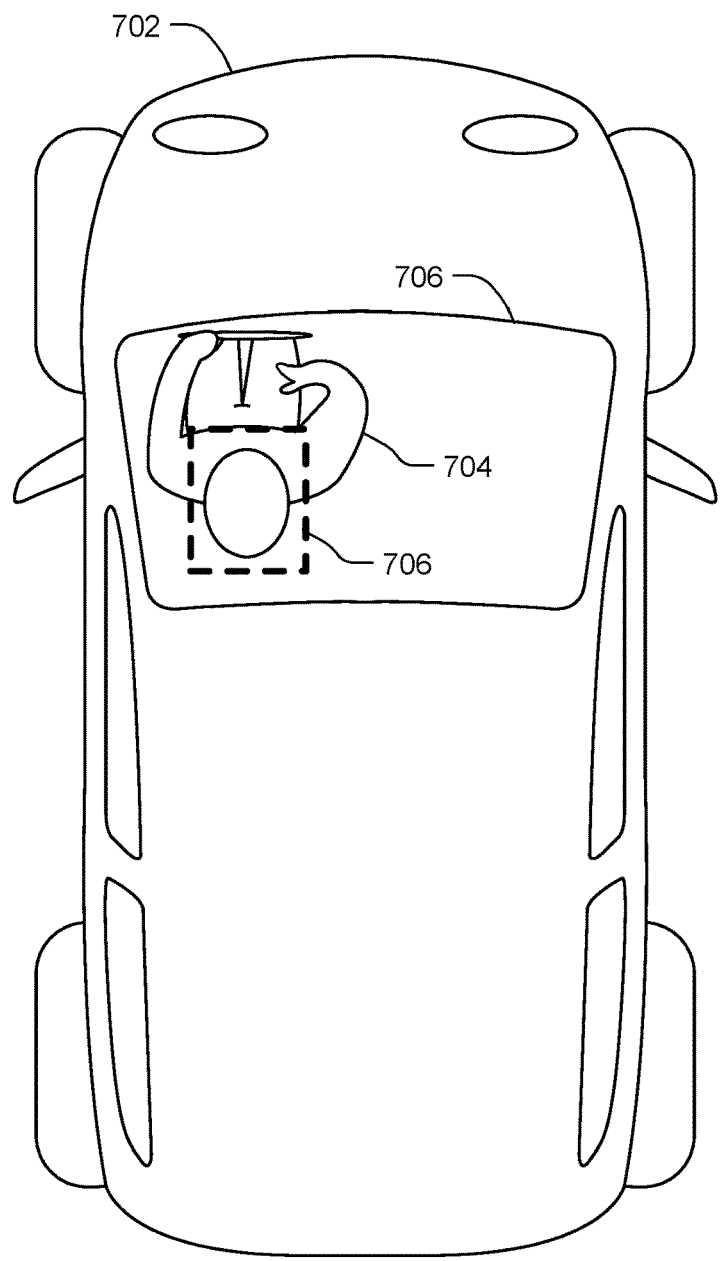
FIG. 7 is another example pictorial view associated with the systems of FIGS. 1-5 according to some implementations.

FIG. 7 is another example pictorial view 700 associated with the systems of FIGS. 1-5 according to some implementations. In this example, the vehicle 702 may again be approaching an exit or entry of a logistics facility. In this example, the senor system may capture sensor data and/or image data associated with a face or other feature of the user 704, as indicated by 706. Again, the sensor system may input the sensor or image data into one or more machine learned models to determine an identity of the driver 704 or other operator (such as when the vehicle is a cargo ship or the like). In the current example, the sensor system is capturing data from above or through a front windshield 706 of the vehicle 702. It should be understood that alternative or additional sensor systems may be positioned such as to capture sensor and/or image data via the side windows or from a front, side, or other perspectives. In some instances, the sensor data from multiple sensor systems may be input into the machine learned models to determine the identity of the driver 704.

Figure 8:
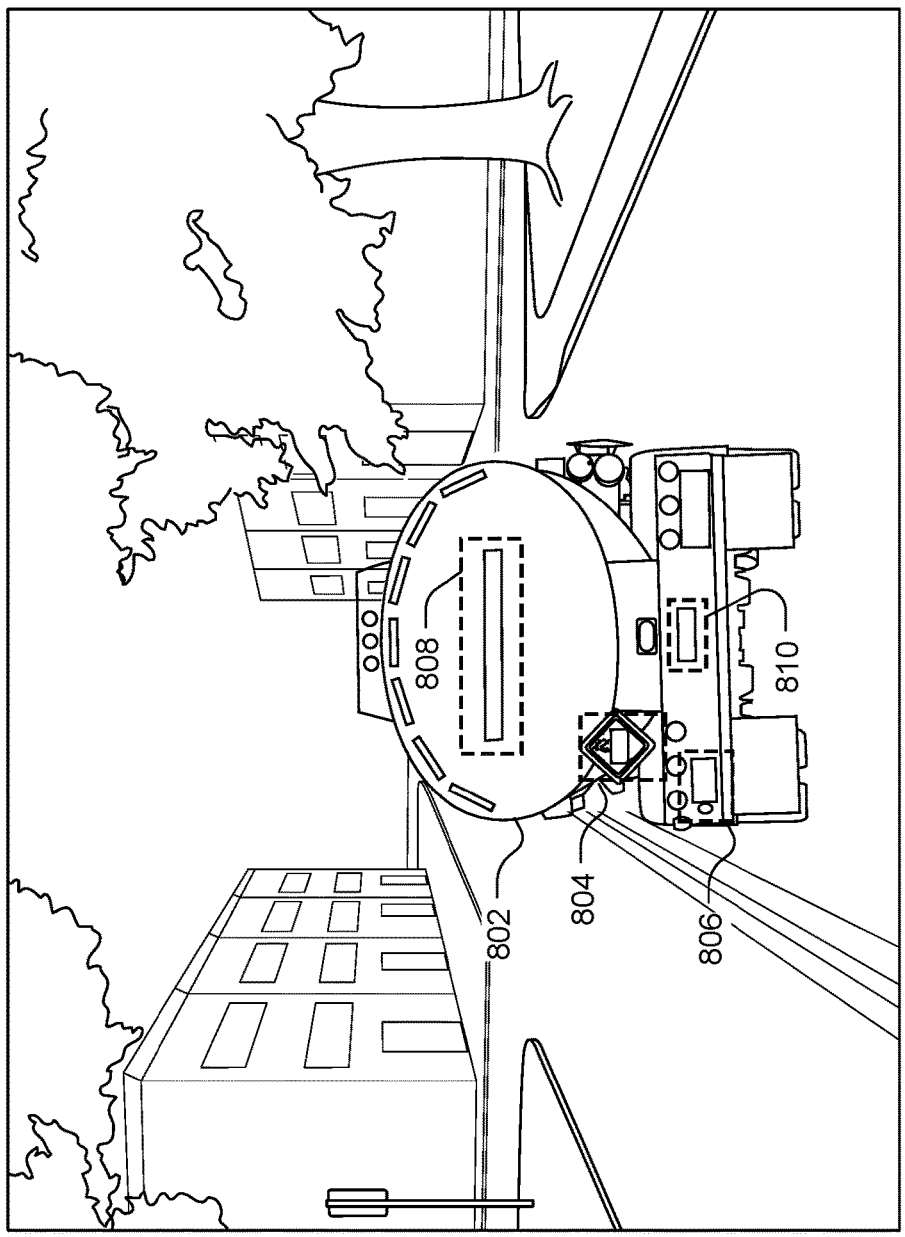
FIG. 8 is another example pictorial view associated with the systems of FIGS. 1-5 according to some implementations.

FIG. 8 is another example pictorial view 800 associated with the systems of FIGS. 1-5 according to some implementations. In the current example, a vehicle 802, such as a tanker truck, may be approaching an exit or entry of a logistics facility and/or passing one or more checkpoints (such as a weight station). In this example, the sensor systems may again capture sensor data and/or image data associated with the vehicle 802. The sensor and/or image data may be input into a machine learned model which may detect various markings on the exterior of vehicle 802 that are usable for tracking, identifying, and reporting on the vehicle 802, as indicated by 804-810.

For example, the machine learned models may extract a license plate, a vehicle license, a vehicle identifier, an entity associated with the vehicle 802, a governing jurisdiction, and the like from the markings on the rear, side, and front of the vehicle 802. The extra content may then be used by the system to verify the vehicle 802, contents of the vehicle 802, a driver of the vehicle 802, an entity responsible for the vehicle 802, a warranty service associated with the vehicle 802, and the like. The system may also use the extracted content to select and complete various forms as the vehicle 802 enters or exits the facility and/or when the contents of the vehicle 802 are unloaded, loaded, or delivered.

Figure 9:
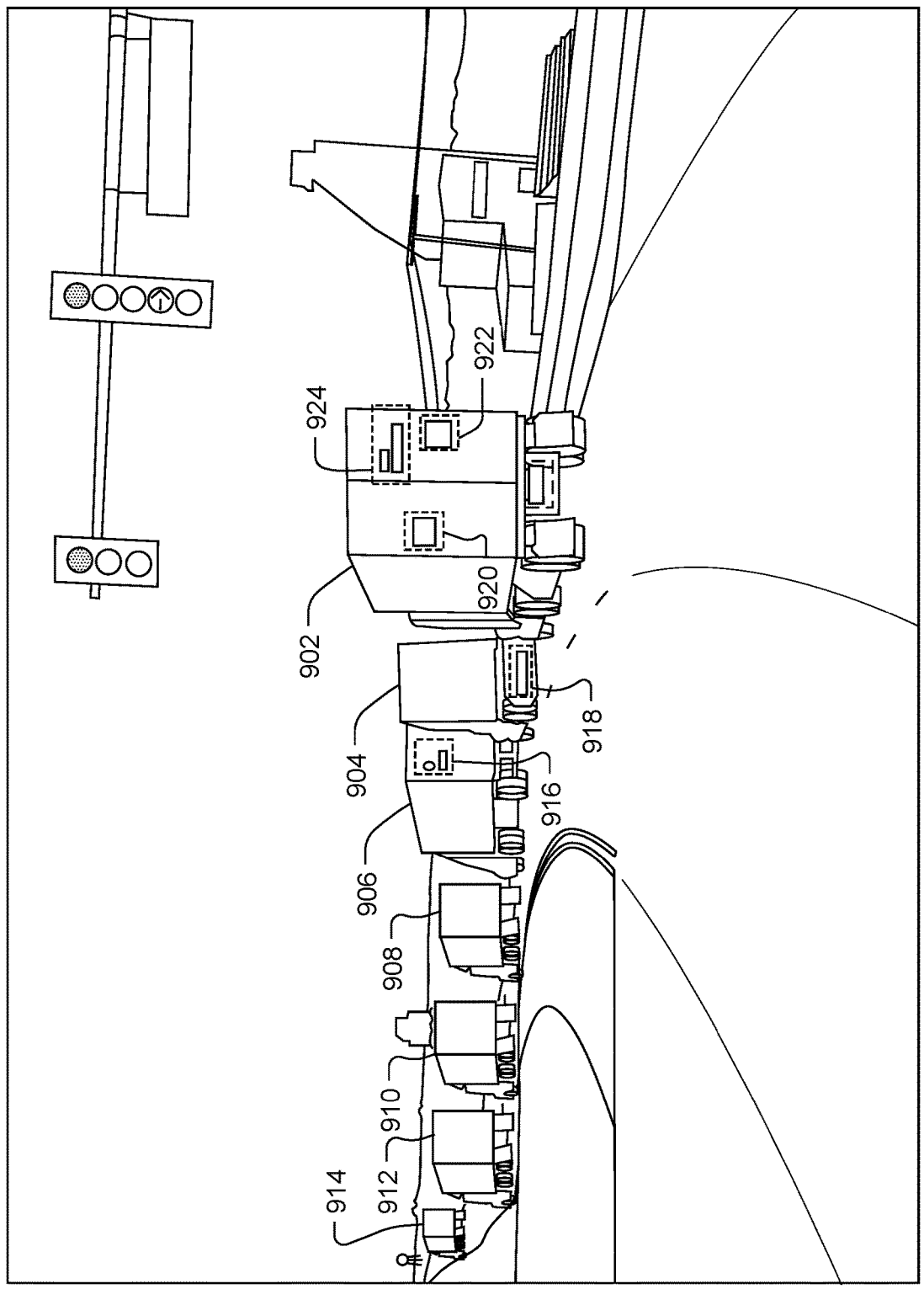
FIG. 9 is another example pictorial view associated with the systems of FIGS. 1-5 according to some implementations.

FIG. 9 is another example pictorial view 900 associated with the systems of FIGS. 1-5 according to some implementations. In the current example, multiple vehicles 902-914 are lined up waiting for entry into a logistic facility, such as a warehouse. In this example, one or more sensors systems may be positioned along the route leading up to the gate of the facility. The sensor systems may capture sensor and/or image data associated with each of the vehicles 902-914 within the field of view of the sensors as the vehicles 902-914 are awaiting entry to the facility.

For instance, in the current example, the vehicles 902-906 may be within the field of view of the sensor system and the system may capture or generate sensor and/or image data associated with the vehicles 902-906. For example, using the captured image and/or sensor data and one or more machine learned models, the system may extract data and information generally indicated by 916-922 and associated with the vehicles 902-906. In this manner, once the individual vehicles 902-914 reach the entry point of the facility, the facility may be ready to accept or reject the delivery, thereby reducing the wait time. For instance, all of the required documentation and inspections may be completed prior to reaching the entry point or gate.

For instance, in some specific examples, the sensor system may also capture information related to the state or condition of the vehicles 902-914 as each vehicle 902-914 enters the field of view. For instance, the system may determine if the container, pallet, carton, on the vehicle 902-914 is damaged, rusting, or otherwise compromised. In one specific example, the system may also utilize radio wave-based image devices or LIDAR image devices or industrial radiography techniques such as Gamma-ray radiography or X-ray radiography, or passive radiography techniques such as Muon tomography that leverage naturally occurring cosmic radiation, to image the contents of the container or goods within the containers.

In this example, the system may then use the sensor and/or image data to determine if the goods within the containers have been properly loaded according to the packing list (such as displayed by the driver as illustrated in FIG. 6 or stored in an accessible database). In other instances, the system may determine if the contents are stacked in alignment with the weight bearing specification and design of the vehicle 902-914, for example, in a manner in which the lightweight goods are stacked above heavier density items.

In some cases, the system may rate or quantify the amount of damage to the goods, carton, container, or vehicle. The system may, in some cases, make a determination based at least in part on the rating or amount of damage to reject the delivery and/or to flag the vehicle 902-914 for manual inspection. In some cases, the system may predict, based on the heatmap and material density based machine learning model, the total weight of the goods that are being carried by the vehicles 902-914 or within the assorted containers. For instance, the sensor system may be associated with a highway weight station, border crossings to predict if the total good loaded violates the legally mandated weight specification for the corresponding vehicle 902-914.

In some cases, the sensor system can also be used to prevent illegal human migration across border that frequently occurs along with transportation of goods. In some cases, such a system may work along with installed IoT (Internet of Things) sensors to provide more accurate weight of the loaded equipment. In some cases, such a system may also work with mobile data capture devices such as smart phones for complete information capture and to enable operational process automation.

Figure 10:
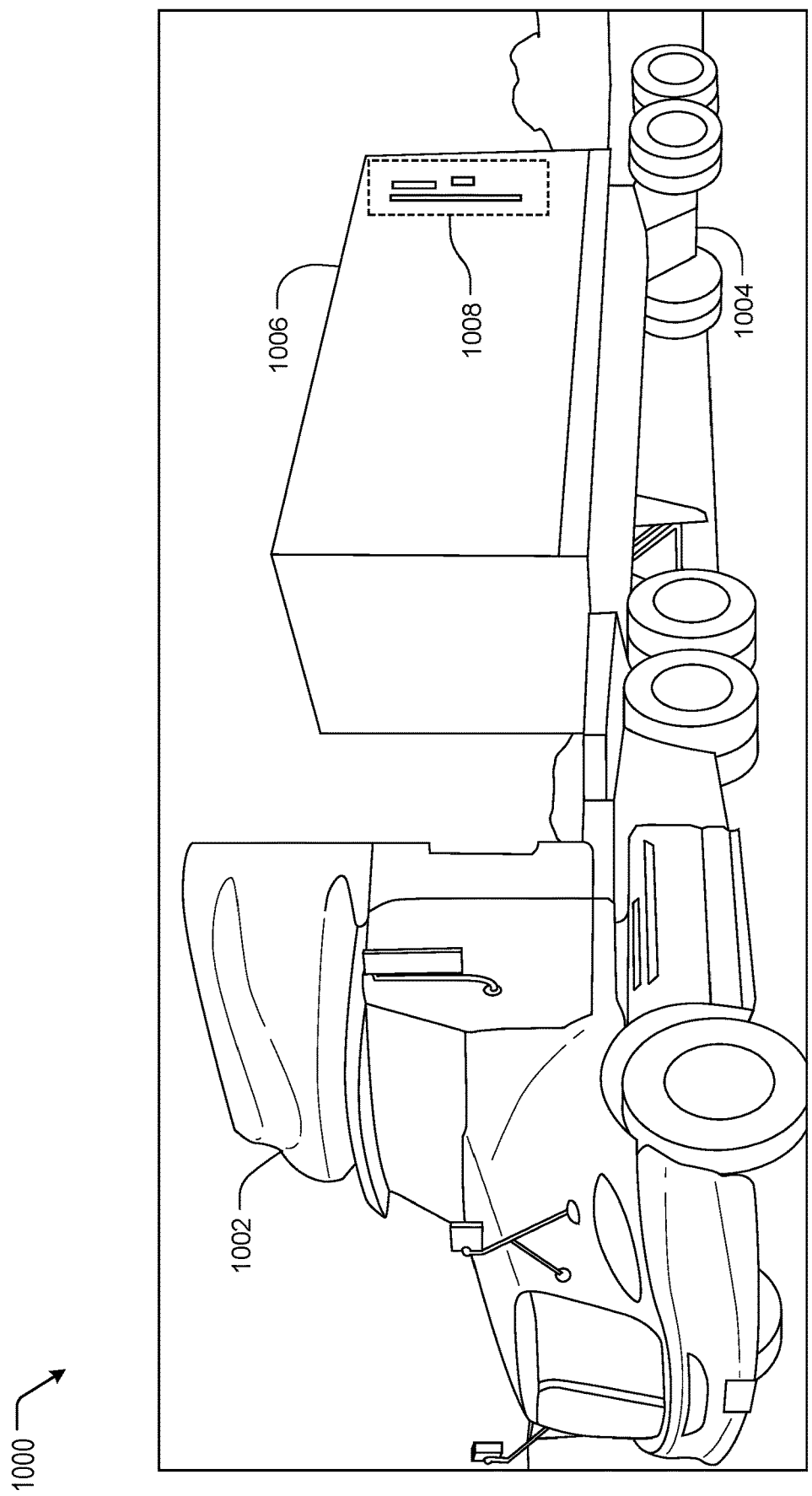
FIG. 10 is another example pictorial view associated with the systems of FIGS. 1-5 according to some implementations.

FIG. 10 is another example pictorial view 1000 associated with the systems of FIGS. 1-5 according to some implementations. In this example, the sensor system may be positioned to capture sensor and/or image data of a vehicle 1002, a chassis 1104, and/or a container 1006 from the side or front-side perspective to allow for extraction of information from the side of the vehicle 1002, the chassis 1004, and/or the container 1006, as indicated by 1008. It may also allow the system to capture data presented by a driver from either the front window or the driver side window.

Figure 11:
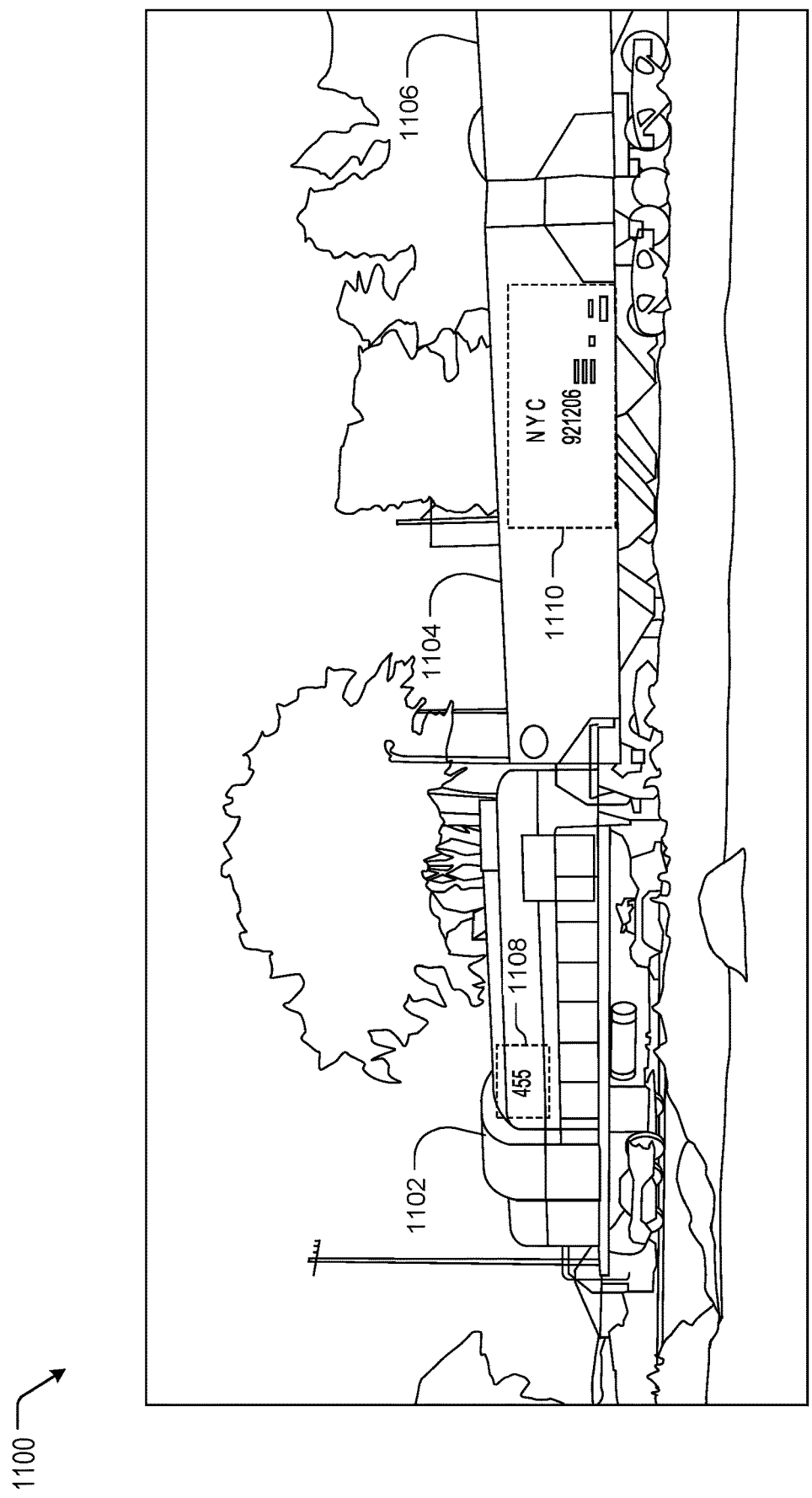
FIG. 11 is another example pictorial view associated with the systems of FIGS. 1-5 according to some implementations.

FIG. 11 is another example pictorial view 1100 associated with the systems of FIGS. 1-5 according to some implementations. In the current example, a vehicle 1102, such as the train, and associated containers 1104 and 1106 may be passing a sensor system prior to entry to, for instance, a rail depot. In this example, the sensor system may capture sensor and/or image data associated with the passing vehicle 1102 as well as each container 1104, 1106, and the like. For instance, the sensor system may capture data usable to extract an identifier 1108 associated with the vehicle 1102 as well as data 1110, such as an identifier, jurisdiction and other information associated with each container 1104-1106.

Figure 12:
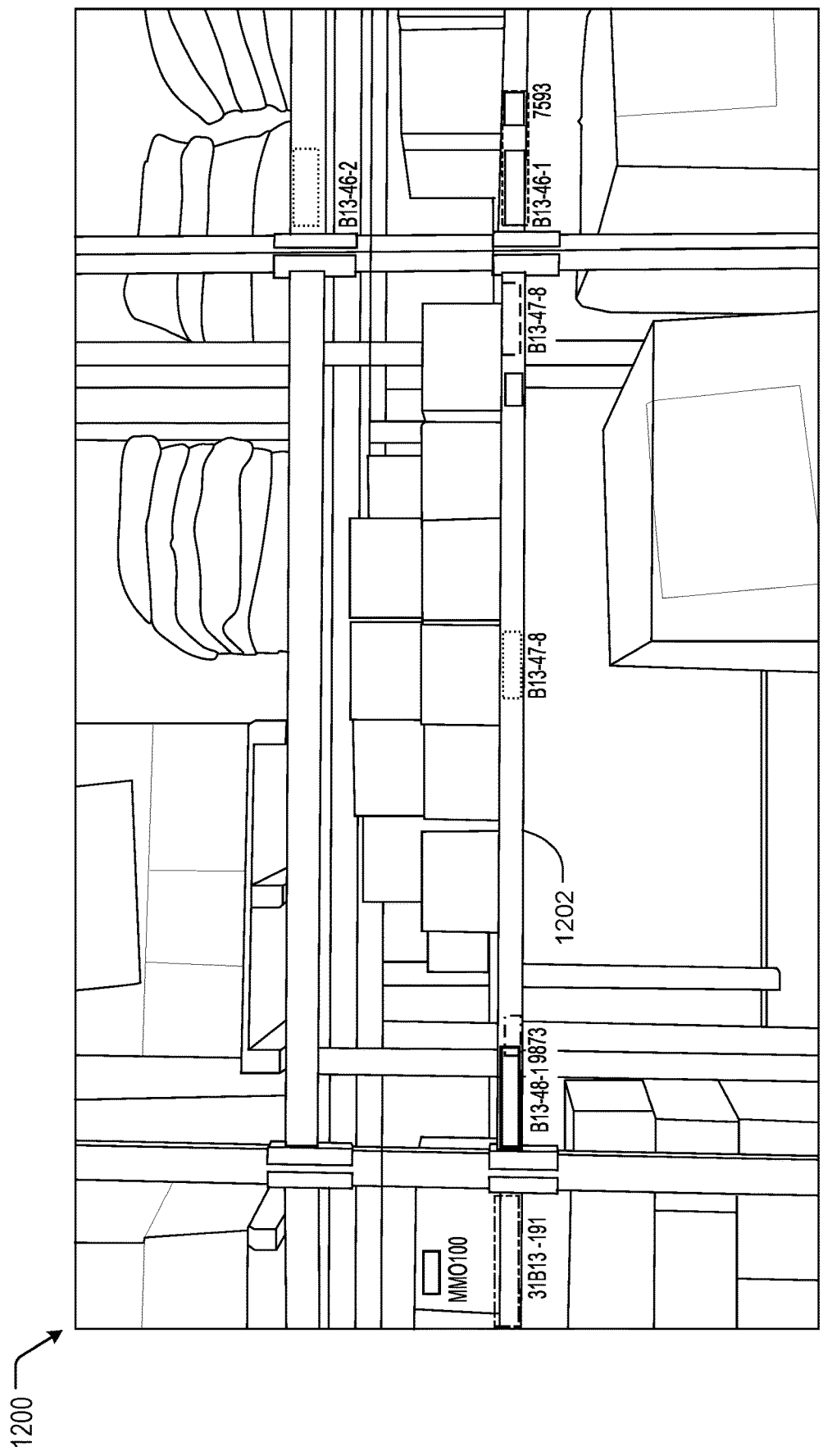
FIG. 12 is another example pictorial view associated with the systems of FIGS. 1-5 according to some implementations.

FIG. 12 is another example pictorial view 1200 associated with the systems of FIGS. 1-5 according to some implementations. In this example, the sensor system may be fixed or mobile within a warehouse or at an unloading point of a facility. In this example, the sensor system, either fixed or mobile (e.g., associated with a land-based or aerial vehicle within the facility), may capture sensor and image data associated with the contents of the shelves 1202 as shown. For instance, in this example, the sensor data may be input into one or more machine learned models that are configured to extract data, such as shelf location, packaging or labels on each item, a number of items, and the like. The extracted data may then be used to send instructions for packing, re-location of merchandise, and/or loading of a vehicle. The data may also be used to complete various documentation and/or inspect each package in a manner discussed above with respect to the contents of the containers.

Figure 13:
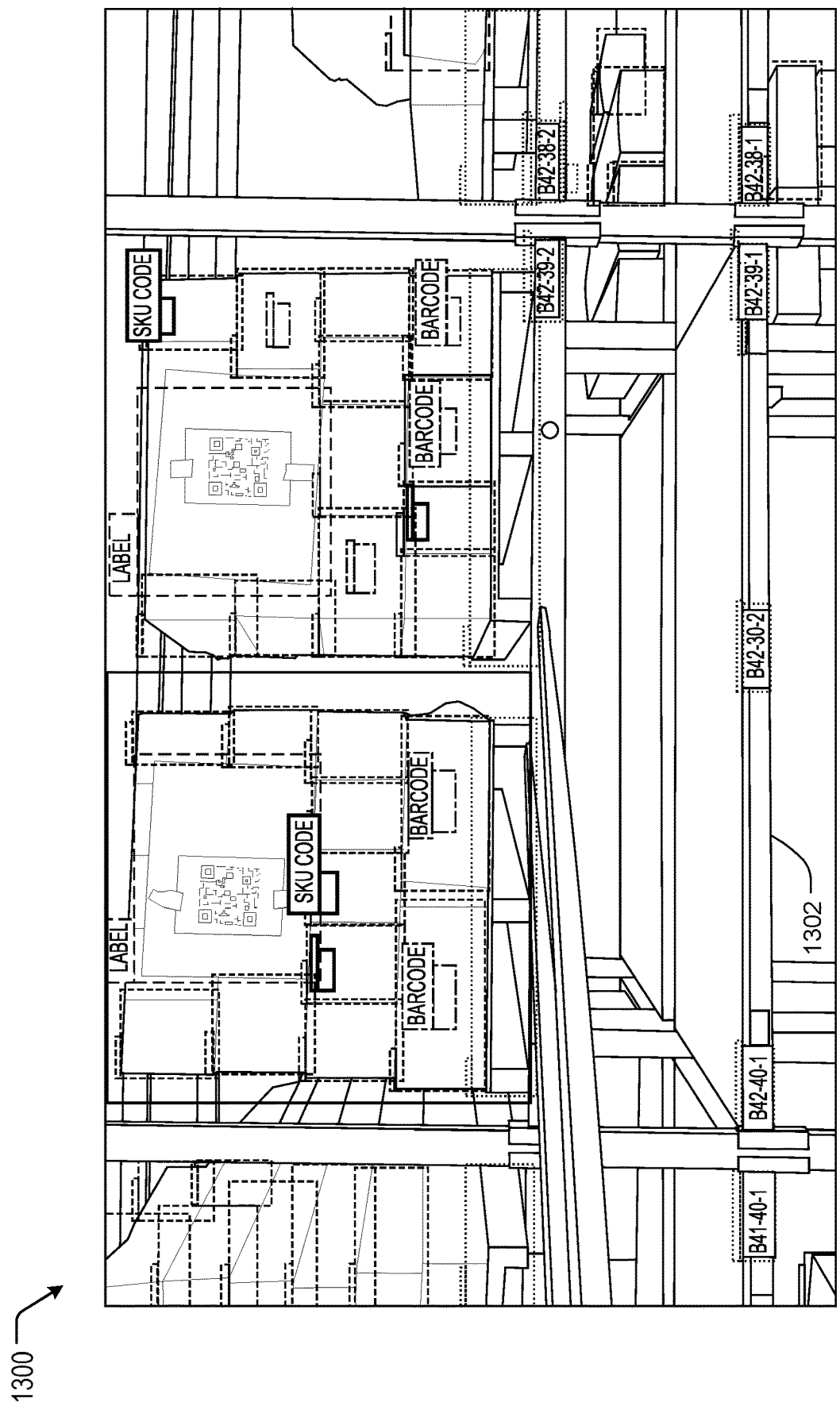
FIG. 13 is another example pictorial view associated with the systems of FIGS. 1-5 according to some implementations.

FIG. 13 is another example pictorial view 1300 associated with the systems of FIGS. 1-5 according to some implementations. In this example, similar to the view 1200 of FIG. 2, the sensor system may be fixed or mobile within a warehouse or at an unloading point of a facility. In this example, the sensor system, either fixed or mobile, may capture sensor and image data associated with the contents of the shelves 1302 as shown. In this example, the system is identifying each individual package and/or item on the shelf 1302 and within the field of view of the sensor system. The system is also identifying various markers, such as barcodes, SKUs, numerical identifiers, and the like, usable to determine the identity and content of each package. Additionally, it should be understood, that the system is extracting the data via one or more machine learned models without the data (e.g., bar code, SKU, and the like) being at a predefined position with respect to the shelf 1302, package or the like. In this manner, the system discussed herein, does not require particular alignment or placement of codes, packages, pallets, or the like.

Figure 14:
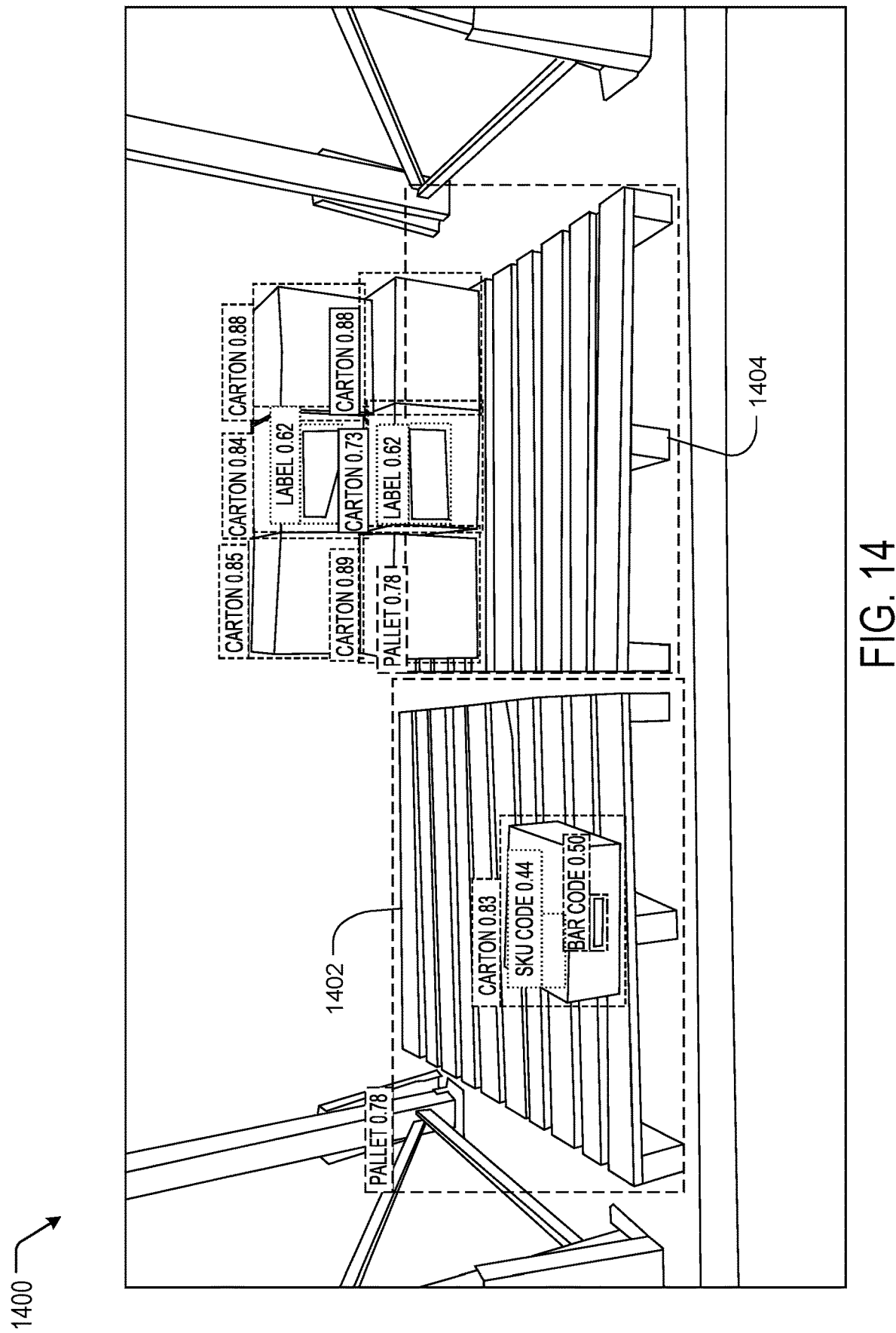
FIG. 14 is another example pictorial view associated with the systems of FIGS. 1-5 according to some implementations.

FIG. 14 is another example pictorial view 1400 associated with the systems of FIGS. 1-5 according to some implementations. In this example, items or packages on pallets 1402 and 1404 are being identified, counted, and categorized by the system. For instance, the system may capture sensor and/or image data associated with the contents of the pallets 1402 and 1404. The system may then input the sensor and/or image data into one or more machine learned models which may then output the identification information, item type or class, as well as a number of items, estimated weight, and other dimensions. This information may then be used to schedule, verify, and/or authorize transit associated with the items and packages, as discussed above.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A method comprising: capturing sensor data associated with a vehicle; determining an identity of the vehicle based at least in part on an output of a first machine learned model accepting the sensor data as an input; determining an identity of a container associated with the vehicle based at least in part on an output of a second machine learned model accepting the sensor data as an input; determining a first status associated with the container based at least in part on the sensor data; identifying a document to be completed based at least in part on the output of the first machine learned model and the output of the second machine learned model; determining an entity associated with the document; completing the document based at least in part on the output of the first machine learned model and the output of the second machine learned model; and transmitting the document to a system associated with the entity.

B. The method of paragraph A, further comprising: determining an identity of an operator of the vehicle based at least in part on an output of a third machine learned model accepting the sensor data as an input.

C. The method of paragraph B, wherein: the first machine learned model, the second machine learned model, and the third machine learned model are part of a single machine learned model.

D. The method of paragraph B, wherein the identity of the operator is determined based at least in part on facial recognition.

E. The method of paragraph A, wherein the sensor data includes one or more of the following: red-green-blue image data; monocular image data; depth data; muon data; LIDAR data; SWIR data; thermal data; or infrared data.

F. The method of paragraph A, further comprising determining a second status associated with the vehicle; and alerting a facility operator to damage based at least in part on the status.

G. The method of paragraph A, further comprising determining an amount of damage associated with a current delivery of the container based at least in part on the first status associated with the container and a second stored status of the container.

H. The method of paragraph A, further comprising determining a second status associated with contents of the container based at least in part on the sensor data; and accepting custody of the contents based at least in part on the second status and the first status.

I. The method of paragraph A, wherein determining the entity associated with the document is based at least in part on the identity of the vehicle and the identity of the container.

J. One or more non-transitory computer-readable media storing instructions that, when executed by one or more processors, cause one or more computing devices to perform operations comprising receiving sensor data associated with a delivery; determining an identity of a vehicle associated with the delivery based at least in part on the sensor data; determining an identity of an entity associated with the delivery based at least in part on the sensor data; identifying a document to be completed based at least in part on the identity of the vehicle and the identity of the entity; completing the document based at least in part on content extracted from the sensor data; and transmitting the document to a system associated with the entity.

K. The non-transitory computer-readable medium of paragraph J, wherein the operations further comprise: determining an amount of damage associated with the delivery based at least in part on the sensor data; and reporting the damage to the system associated with the entity.

L. The non-transitory computer-readable medium of paragraph J, wherein the operations further comprise determining an on time metric associated with the delivery based at least in part on an expected time of arrival of the vehicle and the identity of the vehicle.

M. The non-transitory computer-readable medium of paragraph J, the operations further comprising determining an identity of an operator of the vehicle based at least in part on the sensor data; sending a control signal to a gate associated with a facility, the control signal to case the gate to open; and allowing the vehicle entry into a facility based at least in part on the identity of the operator and the identity of the vehicle.

N. The non-transitory computer-readable medium of paragraph J, wherein the document is associated with a government entity.

O. The non-transitory computer-readable medium of paragraph J, the operations further comprising: authenticating the delivery based at least in part on the identity of the vehicle and the identity of the entity.

P. A computing device comprising: one or more processors; and one or more computer-readable media storing instructions that, when executed by the one or more processors, cause the one or more processors to perform operations comprising receiving first sensor data associated with an exterior of a vehicle; receiving second sensor data associated with an operator of the vehicle; receiving third sensor data associated with an exterior of a container associated with the vehicle; determining based at least in part on the first sensor data, an identity of the vehicle; determining based at least in part on the second sensor data, an identity of the operator; determining based at least in part on the third sensor data, an identity of the container; determining an identity of an entity associated with contents of the container based at least in part on the identity of the vehicle, the identity of the operator, and the identity of the container; identifying a document to be completed based at least in part on the identity of an entity; completing the document based at least in part on content extracted from the first sensor data, the second sensor data, and the third sensor data; and transmitting the document to a system associated with the entity.

Q. The system of paragraph P, wherein the document is a first document and the operations further comprise receiving fourth sensor data associated with a second document presented by the operator; and wherein the first document is completed based at least in part on content extracted from the fourth sensor data.

R. The system of paragraph P, wherein the operations further comprise refusing entry of the vehicle based at least in part on one or more of identity of the vehicle, the identity of the operator, or the identity of the container.

S. The system of paragraph P, wherein the operations further comprise allowing entry of the vehicle based at least in part on one or more of identity of the vehicle, the identity of the operator, or the identity of the container.

T. The system of paragraph P, wherein the operations further comprise selecting a sensor type to generate the first sensor data based at least in part on currently available light metric.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
performing, by a computing system including an imaging sensor, steps comprising:
capturing by the imaging sensor, image data associated with a vehicle, an operator of the vehicle, and a container associated with the vehicle;
determining an identity of the vehicle based at least in part on an output of a first machine learned neural network accepting the image data as an input, the first neural network including at least a first connected layer to segment the image data and a second connected layer to classify the segmented image data, the first machine learned neural network trained based at least in part on image data of vehicles;
determining an identity of the container associated with the vehicle based at least in part on an output of a second machine learned neural network accepting the image data as an input, the second neural network including at least a first connected layer to segment the image data and a second connected layer to classify the segmented image data, the second machine learned neural network trained based at least in part on image data of containers;
determining an identity of the operator associated with the vehicle based at least in part on an output of a third machine learned neural network accepting the image data as an input, the third neural network including at least a first connected layer to segment the image data and a second connected layer to classify the segmented image data, the third neural network trained based at least in part on image data of operators;
determining a first status associated with the container based at least in part on the image data;
identifying a document to be completed based at least in part on the output of the first machine learned neural network and the output of the second machine learned neural network;
determining an entity associated with the document based at least in part on the identity of the vehicle, the identity of the operator, and the identity of the container;
completing the document based at least in part on the output of the first machine learned neural network, the output of the second machine learned neural network, and the output of the third machine learned neural network; and
transmitting, via one or more networks, the document to a remote system associated with the entity.

2. The method of claim 1, wherein:
the first machine learned neural network, the second machine learned neural network, and the third machine learned neural network-part of a single machine learned neural network.

3. The method of claim 1, wherein the identity of the operator is determined based at least in part on facial recognition.

4. The method of claim 1, wherein the image data includes one or more of the following:
red-green-blue image data;
monocular image data;
depth data;
LIDAR data; or
infrared data.

5. The method of claim 1, further comprising:
determining a second status associated with the vehicle; and
alerting a facility operator to damage based at least in part on the first status or the second status.

6. The method of claim 1, further comprising:
determining an amount of damage associated with a current delivery of the container based at least in part on the first status associated with the container and a second stored status of the container.

7. The method of claim 1, further comprising:
determining a second status associated with contents of the container based at least in part on the image data; and
accepting custody of the contents based at least in part on the second status and the first status.

8. One or more non-transitory computer-readable media storing instructions thereon that, when executed by one or more computing devices, cause the one or more computing devices to perform operations comprising:
- receiving lidar data, associated with a delivery from at least one lidar sensor;
- determining an identity of a vehicle associated with the delivery based at least in part on the lidar data input into a first machine learned neural network, the first machine learned neural network trained on first lidar data of vehicles;
- determining an identity of an entity associated with the delivery based at least in part on the lidar data input into a second machine learned neural network, the second machine learned neural network trained on second lidar data of vehicles;
- identifying a document to be completed based at least in part on the identity of the vehicle and the identity of the entity;
- completing the document based at least in part on content extracted from the lidar data;
- transmitting, via one or more first networks, the document to a remote system associated with the entity;
- detecting damage associated with the delivery based at least in part on the lidar data;
- determining, in response to detecting the damage, an amount of damage associated with the delivery based at least in part on the lidar data and a first recorded status of the vehicle associated with the delivery and a second recorded status of a container associated with the delivery determined at a time of deployment;
- determining, in response to detecting the damage and based at least in part on the lidar data, the first recorded status of the vehicle, and the second recorded status of the container, if the damage occurred during shipping; and
- reporting, via one or more second networks, the amount of damage to the remote system associated with the entity.

9. The one or more non-transitory computer-readable media as recited in claim 8, wherein the operations further comprise:
- determining an on time metric associated with the delivery based at least in part on an expected time of arrival of the vehicle and the identity of the vehicle.

10. The one or more non-transitory computer-readable media as recited in claim 8, the operations further comprising:
- determining an identity of an operator of the vehicle based at least in part on the lidar data input into a third machine learned neural network, the third machine learned neural network trained on lidar data of operators;
- sending a control signal to a gate associated with a facility, the control signal to cause the gate to open; and
- allowing the vehicle entry into a facility based at least in part on the identity of the operator and the identity of the vehicle.

11. The one or more non-transitory computer-readable media as recited in claim 8, wherein the document is associated with a government entity.

12. The one or more non-transitory computer-readable media as recited in claim 8, the operations further comprising:
- authenticating the delivery based at least in part on the identity of the vehicle and the identity of the entity.

13. The one or more non-transitory computer-readable media as recited in claim 8, wherein completing the document includes assigning liability for the damage.

14. The one or more non-transitory computer-readable media as recited in claim 8, wherein the operations further comprise:
- determining, based at least in part on the amount of damage, if repairs to the vehicle or the container are necessary before redeployment.

15. The one or more non-transitory computer-readable media as recited in claim 14, wherein the operations further comprise:
- receiving thermal data associated with the delivery; and
- wherein:
  - detecting damage associated with the delivery is based at least in part on the thermal data;
  - determining the amount of damage is based at least in part on the thermal data;
  - determining if the damage occurred during shipping is based at least in part on the thermal data; and
  - determining the repairs to the vehicle or the container is based at least in part on the thermal data.

16. An EDGE computing system comprising:
- one or more processors; and
- one or more computer-readable media storing instructions that, when executed by the one or more processors, cause the one or more processors to perform operations comprising:
  - one or more image devices of the EDGE computing system;
  - one or more depth sensors of the EDGE computing system;
  - receiving, from the one or more image devices, first image data associated with an exterior of a vehicle;
  - receiving, from the one or more image devices, second image data associated with an operator of the vehicle;
  - receiving, from the one or more image devices, third image data associated with an exterior of a container associated with the vehicle;
  - receiving, from the one or more depth sensors, first depth data associated with the exterior of the vehicle;
  - receiving, from the one or more depth sensors, second depth data associated with the operator of the vehicle;
  - receiving, from the one or more depth sensors, third depth data associated with the exterior of the container associated with the vehicle;
  - determining, based at least in part on inputting the first image data and the first depth data into a first machine learned neural network, an identity of the vehicle, the first machine learned neural network trained based at least in part on image data and depth data of vehicles;
  - determining, based at least in part on inputting the second image data and the second depth data into a second machine learned neural network, an identity of the operator, the second machine learned neural network trained based at least in part on image data and depth data of operators;
  - determining, based at least in part on inputting the third image data and the third depth data into a third machine learned neural network, an identity of the container, the third machine learned neural network trained based at least in part on image data and depth data of containers;
  - determining an identity of an entity associated with contents of the container based at least in part on the identity of the vehicle, the identity of the operator, and the identity of the container;
  - identifying a document to be completed based at least in part on the identity of an entity;

completing the document based at least in part on content extracted from the first image data, the second image data, and the third image data; and transmitting, via one or more networks, the document to a remote system associated with the entity.

17. The system of claim 16, wherein the document is a first document and the operations further comprise:

receiving fourth image data associated with a second document presented by the operator; and wherein the first document is completed based at least in part on content extracted from the fourth image data.

18. The system of claim 16, wherein the operations further comprise refusing entry of the vehicle based at least in part on one or more of the identity of the vehicle, the identity of the operator, or the identity of the container.

19. The system of claim 16, wherein the operations further comprise allowing entry of the vehicle based at least in part on one or more of the identity of the vehicle, the identity of the operator, or the identity of the container.

20. The system of claim 16, wherein the operations further comprise selecting a sensor type to generate the first image data based at least in part on currently available light metric.

* * * * *